United States Patent
Song et al.

(10) Patent No.: US 9,503,800 B2
(45) Date of Patent: Nov. 22, 2016

(54) GLASS-TYPE TERMINAL AND METHOD OF CONTROLLING THE SAME

(71) Applicant: LG ELECTRONICS INC., Seoul (KR)

(72) Inventors: Yoomee Song, Seoul (KR); Taehoon Cho, Seoul (KR); Jiyeon Kim, Seoul (KR); Jungmin Park, Seoul (KR); Janghwan Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 72 days.

(21) Appl. No.: 14/566,467

(22) Filed: Dec. 10, 2014

(65) Prior Publication Data

US 2015/0341717 A1    Nov. 26, 2015

(30) Foreign Application Priority Data

May 22, 2014  (KR) ........................ 10-2014-0061721

(51) Int. Cl.
| | |
|---|---|
| H04R 3/00 | (2006.01) |
| H04R 1/08 | (2006.01) |
| G10L 17/22 | (2013.01) |
| G06F 3/16 | (2006.01) |
| G02B 27/01 | (2006.01) |

(52) U.S. Cl.
CPC ............... *H04R 1/08* (2013.01); *G02B 27/017* (2013.01); *G06F 3/167* (2013.01); *G10L 17/22* (2013.01)

(58) Field of Classification Search
None
See application file for complete search history.

(56) References Cited

U.S. PATENT DOCUMENTS

| | | | |
|---|---|---|---|
| 8,184,067 B1 | 5/2012 | Braun et al. | |
| 2012/0235896 A1 | 9/2012 | Jacobsen et al. | |
| 2013/0278631 A1* | 10/2013 | Border | G06F 1/163 345/633 |
| 2014/0029762 A1* | 1/2014 | Xie | H04R 3/00 381/94.1 |

FOREIGN PATENT DOCUMENTS

| | | |
|---|---|---|
| EP | 2801974 A2 | 11/2014 |
| TW | 201006265 A | 2/2010 |

* cited by examiner

*Primary Examiner* — Muhammad N Edun
(74) *Attorney, Agent, or Firm* — Birch, Stewart, Kolasch & Birch, LLP

(57) ABSTRACT

A glasses-type terminal including a main body configured to be worn as glasses on a user's head; a first microphone configured to detect a vibration signal through a skull portion of the user in which a voice being input propagates through the skull portion of the user; a second microphone configured to detect a voice signal in which the voice being input propagates over the air; a memory configured to store a pre-registered vibration signal and a pre-registered voice signal corresponding to a pre-registered voice; and a controller configured to switch a locked state to an unlocked state when the vibration signal detected through the first microphone is matched to the pre-registered vibration signal and the voice signal detected through the second microphone is matched to the pre-registered voice signal.

20 Claims, 13 Drawing Sheets

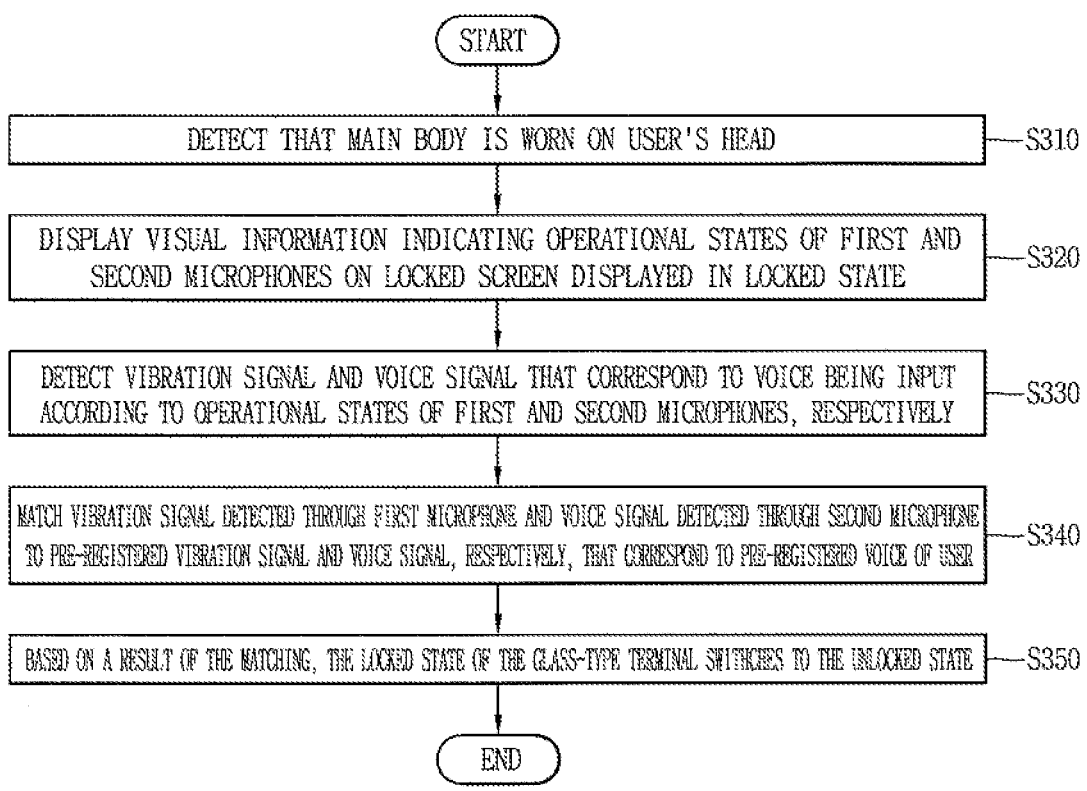

GLASS-TYPE TERMINAL AND METHOD OF CONTROLLING THE SAME

CROSS-REFERENCE TO RELATED APPLICATION

Pursuant to 35 U.S.C. §119(a), this application claims the benefit of earlier filing date and right of priority to Korean Application No. 10-2014-0061721, filed on May 22, 2014, the contents of which is incorporated by reference herein in its entirety.

BACKGROUND OF THE INVENTION

1. Field of the Invention

The present invention relates to a glasses-type terminal configured to be worn as glasses on a user's head.

2. Background of the Invention

Terminals may be generally classified as mobile/portable terminals or stationary terminals. Mobile terminals may also be classified as handheld terminals or vehicle mounted terminals. Further, mobile terminals have become increasingly more functional. Examples of such functions include data and voice communications, capturing images and video via a camera, recording audio, playing music files via a speaker system, and displaying images and video on a display.

Some mobile terminals include additional functionality which supports game playing, while other terminals are configured as multimedia players. More recently, mobile terminals have been configured to receive broadcast and multicast signals which permit viewing of content such as videos and television programs.

In most instances, a mobile terminal is held in one hand while in use. In the recent years, the mobile terminal has evolved into a wearable device. One example of the wearable device is a glasses-type terminal. In addition, for personalization and protection of the user's privacy, the glasses-type terminal can enter a locked state for limiting input of a control command by persons other than the user. The locked state can be unlocked by satisfying a predetermined condition.

The more complicated canceling the locked state of the glasses-type terminal becomes, the more the security is enhanced, but the user's convenience is lowered. Conversely, the higher the level of the user's convenience, the weaker the security. For example, if the locked state of the glasses-type terminal is set to be canceled when a wearer says a specific word, a third party other than the user can say the specific word to cancel the locked state.

SUMMARY OF THE INVENTION

Therefore, an aspect of the detailed description is to provide a security enhanced glasses-type terminal in which a locked state can be canceled in a convenient manner.

Another aspect of the detailed description is to provide a glasses-type terminal that can recognize a voice of a wearer in a more precise manner and thus protect the user's privacy. To achieve these and other advantages and in accordance with the purpose of this specification, as embodied and broadly described herein, the present invention provides a glasses-type terminal including a main body configured to be worn as glasses on a user's head; a first microphone configured to detect a vibration signal through a skull portion of the user in which a voice being input propagates through the skull portion of the user; a second microphone configured to detect a voice signal in which the voice being input propagates over the air; a memory configured to store a pre-registered vibration signal and a pre-registered voice signal corresponding to a pre-registered voice; and a controller configured to switch a locked state to an unlocked state when the vibration signal detected through the first microphone is matched to the pre-registered vibration signal and the voice signal detected through the second microphone is matched to the pre-registered voice signal. The present invention also provides a corresponding method of controlling a glasses-type terminal.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments and together with the description serve to explain the principles of the invention.

In the drawings:

FIG. 3 is a flowchart illustrating a method of controlling the glasses-type terminal according to one embodiment of the present invention;

DETAILED DESCRIPTION OF THE INVENTION

Description will now be given in detail according to embodiments disclosed herein, with reference to the accompanying drawings. For the sake of brief description with reference to the drawings, the same or equivalent components may include the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help easily understand various technical features and the embodiments presented herein are not limited by the accompanying drawings. As such, the present invention should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and are intended to indicate an existence of several components, functions or steps, disclosed in the specification, and greater or fewer components, functions, or steps may likewise be utilized.

Figure 1:
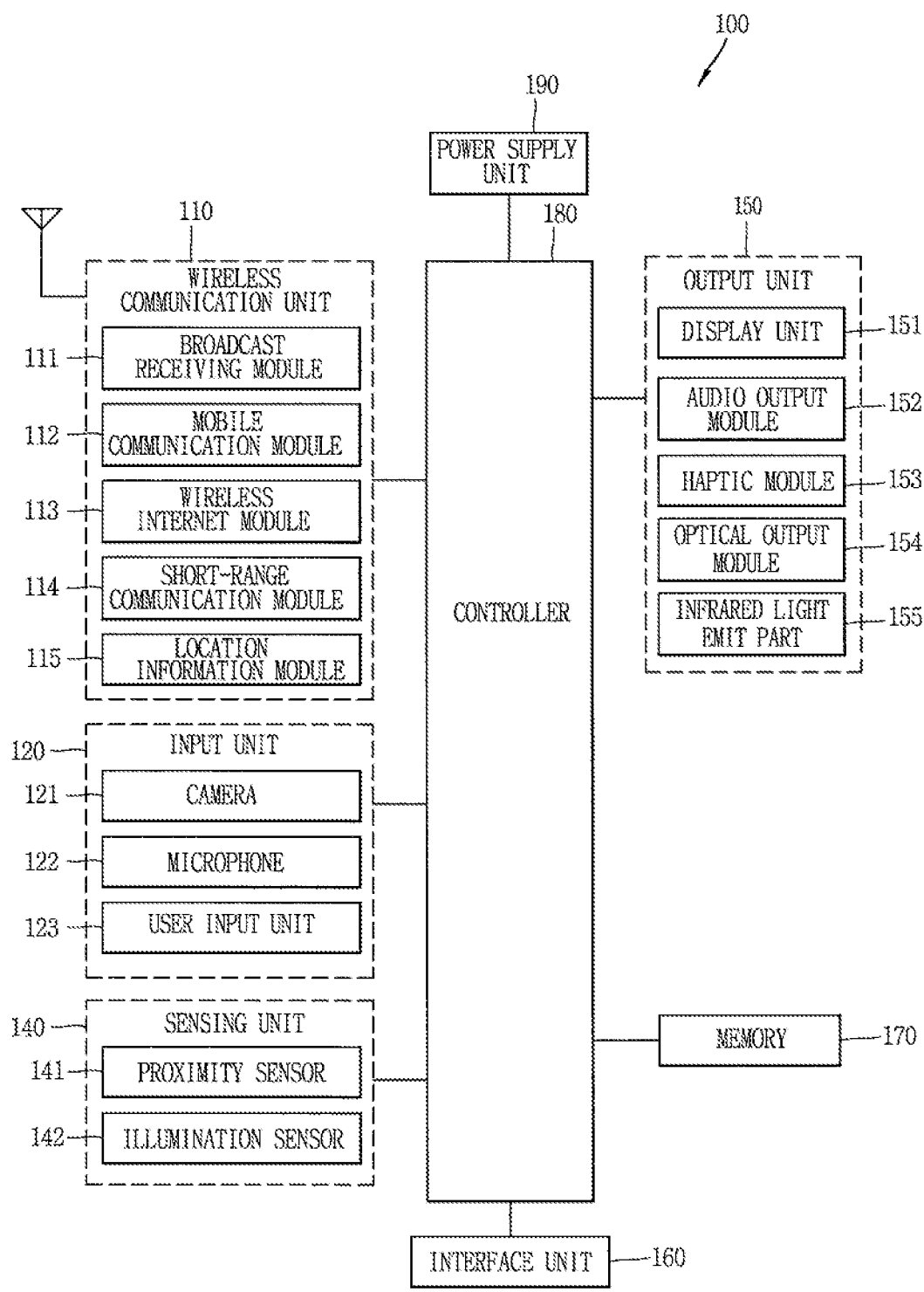
FIG. 1 is a block diagram of a glasses-type terminal according to one embodiment of the present invention.

FIG. 1 is a block diagram of a glasses-type terminal 100 according to an embodiment of the present invention. The glasses-type terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and greater or fewer components may alternatively be implemented.

The wireless communication unit 110 typically includes one or more modules which permit communications such as wireless communications between the glasses-type terminal 100 and a wireless communication system, communications between the glasses-type terminal 100 and another mobile terminal, communications between the glasses-type terminal 100 and an external server, etc. Further, the wireless communication unit 110 typically includes one or more modules which connect the glasses-type terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

A user's voice and other sound are input into the microphone 122 and are processed into electric audio data by the microphone 122. The microphone 122 can be provided to multiple places and is configured so stereo sound is input into the microphone 122. In addition, the microphone 122 can include a first microphone and a second microphone. The second microphone is a microphone that detects a voice signal in which a sound being input propagates over the air. The first microphone is a bone conduction microphone in which the sound being input vibrates the skull and a sound wave propagates.

The sensing unit 140 is typically implemented using one or more sensors configured to sense internal information of the mobile terminal, the surrounding environment of the mobile terminal, user information, and the like. For example, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The glasses-type terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, an optical output module 154, and an infrared light emitting part 155. The display unit 151 may have an inter-layered structure or an integrated structure with a touch sensor in order to facilitate a touch screen. The touch screen may provide an output interface between the glasses-type terminal 100 and a user, as well as function as the user input unit 123 which provides an input interface between the glasses-type terminal 100 and the user.

The infrared light emitting part 155 is configured to generate and project infrared light to the outside. In order to support the viewing angle range of the camera 121, the infrared light emitting part 155 may include a plurality of infrared light emitting devices condensed at a position adjacent to the camera 121. The infrared light emitting part 155 may operate independently from the camera 121, or may operate so as to generate light when the camera 121 is driven.

The interface unit 160 serves as an interface with various types of external devices that can be coupled to the glasses-type terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the glasses-type terminal 100 may perform assorted control functions associated with a connected external device, in response to the external device being connected to the interface unit 160.

The memory 170 is typically implemented to store data to support various functions or features of the glasses-type terminal 100. For instance, the memory 170 may be configured to store application programs executed in the glasses-type terminal 100, data or instructions for operations of the glasses-type terminal 100, and the like. Some of these application programs may be downloaded from an external server via wireless communication.

Other application programs may be installed within the glasses-type terminal 100 at time of manufacturing or shipping, which is typically the case for basic functions of the glasses-type terminal 100 (for example, receiving a call, placing a call, receiving a message, sending a message, and the like). It is common for application programs to be stored in the memory 170, installed in the glasses-type terminal 100, and executed by the controller 180 to perform an operation (or function) for the glasses-type terminal 100.

The controller 180 typically functions to control overall operation of the glasses-type terminal 100, in addition to the operations associated with the application programs. The controller 180 can provide or process information or functions appropriate for a user by processing signals, data, information and the like, which are input or output by the various components, or activating application programs stored in the memory 170. As one example, the controller 180 controls some or all of the components according to the execution of an application program that have been stored in the memory 170.

The power supply unit 190 can be configured to receive external power or provide internal power in order to supply appropriate power required for operating elements and components included in the glasses-type terminal 100. The power supply unit 190 includes a battery, and the battery is configured to be chargeable.

At least some of the above components may operate in a cooperating manner, so as to implement an operation or a control method of a glasses-type terminal according to various embodiments to be explained later. The operation or the control method of the glasses-type terminal may be implemented on the glasses-type terminal by driving at least one application program stored in the memory 170.

Figure 2:
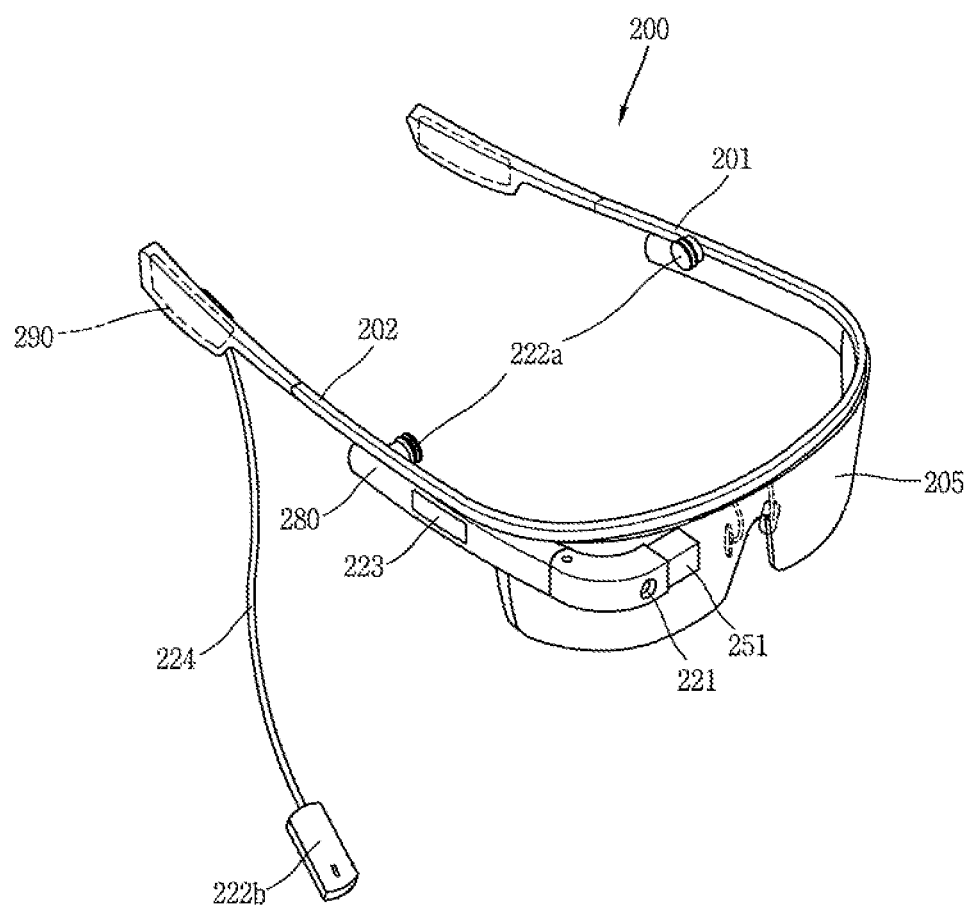
FIG. 2 is a perspective diagram of the glasses-type terminal according to one embodiment of the present invention.

Next, FIG. 2 is a view illustrating a glasses-type terminal 200 according to an embodiment of the present invention. Referring to FIG. 2, the glasses-type terminal 200 is configured to be worn as glasses on the user's head, and includes a frame unit 201 (or case, housing, etc.). The frame unit 201 may be formed of a flexible material for enhanced wearability. In the drawings, the frame unit 201 includes a first frame 201 and a second frame 202.

The frame unit 201 is supported by the user's head, and provides a space where various types of components are mounted. As shown, electronic components such as a controller 280, a power supply unit 290 and an audio output module may be mounted in the frame unit 201. A lens 205 for covering at least one of a left eye and a right eye may be detachably mounted to the frame unit 201.

The controller 280 is configured to control various types of components of the glasses-type terminal 200. The controller 280 may have a configuration corresponding to the aforementioned controller 180. In the drawings, the controller 280 is installed at a frame on one side of the user's head. However, the position of the controller 280 is not limited to this.

A display unit 251 may be implemented in the form of a Head Mounted Display (HMD). The HMD indicates a display mounted to a head and is configured to display an image in front of the user's eyes. The display unit 251 may be disposed to correspond to at least one of a left eye and a right eye, such that an image is directly provided in front of the user's eyes when the user is wearing the glasses-type terminal 200. In the drawings, the display unit 251 is arranged in correspondence to a right eye so that an image can be output toward the user's right eye.

The display unit 251 can project an image to the user's eyes using a prism. The prism may be formed to be transmissive so that a user can see not only a projected image, but also a general view (a range viewable through the user's eyes). An image output to the display unit 251 can be overlapped with a general view. The glasses-type terminal 200 may provide an Augmented Reality (AR) configured to overlap a virtual image to a real image or background for a single image.

A camera 221 is disposed close to at least one of a left eye and a right eye, and is configured to capture a front image. The camera 221 can obtain a scene at which a user is looking as an image, because it is positioned close to the user's eye. In the drawings, the camera 221 is provided at the second frame 202 near the controller 280. However, the present invention is not limited to this. For instance, the camera 221 may be installed at the first frame 201. Alternatively, the camera 221 may be provided in plurality so as to obtain a stereoscopic image.

The glasses-type terminal 200 may include a user input unit 223 manipulated for input of a control command. The user input unit 223 may employ any tactile method that allows a user to perform manipulation such as touch, push, scroll or the like. In the drawings, a touch type of user input unit 223 is provided at the frame unit 201.

In addition, first and second microphones 222a and 222b and a sound output module are provided to the glasses-type terminal 200. The first and second microphones 222a and 222b process input sound into vibration data and audio data, respectively. The sound output module is configured so sound propagates in a general sound output method or a bone conduction method. The sound output module, if realized in the bone conduction method, is provided to the same insertion portion as the first microphone 222a. That is, if the user wears the glasses-type terminal 200, the sound output module comes into close contact with the head so the vibration of the skull makes sound propagate.

The first and second microphones 222a and 222b are described in detail below referring to the drawings. The first microphones 222a are provided to insertion portions, respectively, on the insides of the frames 201 and 202, and are configured to correspond to at least one of the user's left and right ears. In addition, the first microphone 222a is the bone conduction microphone equipped with a bone conduction pickup element.

With the first microphone 222a realized in this manner, when the user produces a voice, a vibration signal of the produced voice propagates through an external auditory canal. In addition, if the first microphone 222a is provided to the same insertion portion as the bone-conduction type sound output module, the first microphone 222a and the sound output module are configured so only one of them operates selectively, in order to prevent a malfunction due to an echo phenomenon. As described below, the glasses-type terminal 200 has a configuration in which when the user wears the glasses-type terminal 200, the sound output module comes into close contact with the head so bone conduction vibration makes sound propagate.

With a connector 224, the second microphone 222b is removably mounted on the second frame 202. Thus, the second microphone 222b is combined with the main body. In addition, the second microphone 222b converts a user' voice into an electric signal.

In addition, the first microphone 222a and the second microphone 222b can detect a voice signal and a vibration signal and a voice signal, respectively, from one voice that is input, at the same time. For convenience in description, the vibration signal of the user's voice detected through the first microphone 222a when the user's voice is input is defined as an "internal voice," and the voice signal of the user's voice detected through the second microphone 222b is defined as an "external voice."

When the main body is detected as being worn in a locked state where inputting of a control command into an application is limited, the glasses-type terminal 200 according to an embodiment of the present invention matches the vibration signal of the voice of the wearer (e.g., the user wearing the glasses), that is the internal voice, detected through the first microphone 222a, to the vibration signal that corresponds to a pre-registered voice of the user, and matches the voice signal of the voice of the wearer detected through the second microphone 222b, to the voice signal that corresponds to the pre-registered voice of the user. That is, when the user speaks, his or her voice will propagate through their skull and this propagation is detected by the microphone 222a.

The locked state is switched to an unlocked state when the vibration signal and the voice signal of the user's voice detected through the first microphone 222a and the second microphone 222b, respectively, are matched to the vibration signal and the voice signal, respectively, corresponding to the pre-registered voice of the user, respectively.

In addition, the locked state corresponds to when inputting of a user's control command applications installed on the glasses-type terminal 200 is limited. This prevents the user's unintended control command from being input to activate or inactivate functions of the glasses-type terminal 200 and the applications installed on the glasses-type terminal 200, and prevents an unwanted third party from wearing the glasses-type terminal 200 and executing the applications. Further, in the locked state, the inputting of the user's control command is limited, but the functions of the glasses-type terminal 200 and the applications installed on the glasses-type terminal 200 in the activated state before entering the locked state can be performed and be executed, respectively, without interruption.

In addition, the unlocked state corresponds to when the inputting of the user's control command is not limited. In more detail, in the unlocked state, the functions of the glasses-type terminal 200 and the applications installed on the glasses-type terminal 200 are activated or inactivated according to the control command input by the user.

Further, the locked state is activated when the glasses-type terminal 200 is removed for a predetermined time, or if no control command is detected for a predetermined time after wearing the glasses-type terminal 200. Also, the predetermined time can be changed according to user's setting. In addition, the locked state may be entered when the user applies a predetermined input.

Figure 4A:
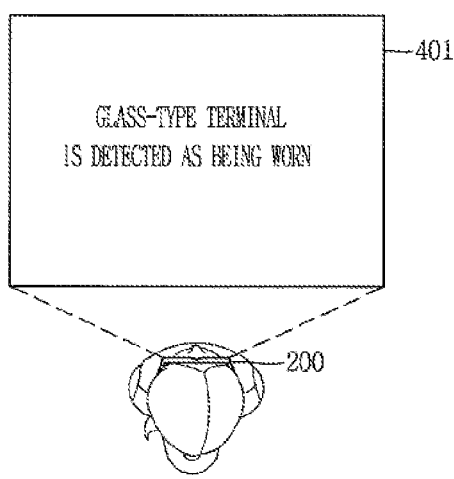
FIGS. 4(a) to 4(e) are diagrams illustrating the flow chart in FIG. 3.
Figure 4B:
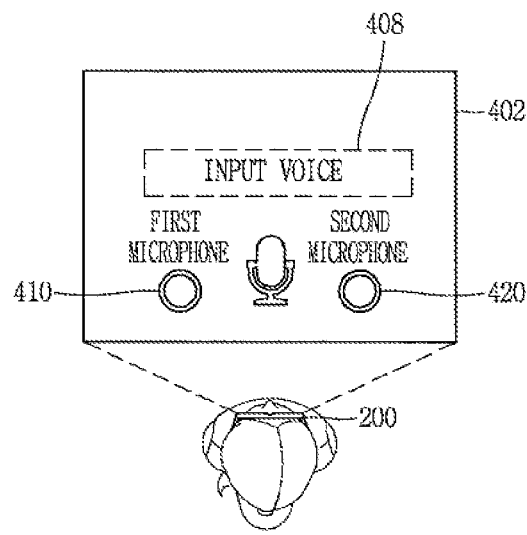
Figure 4D:
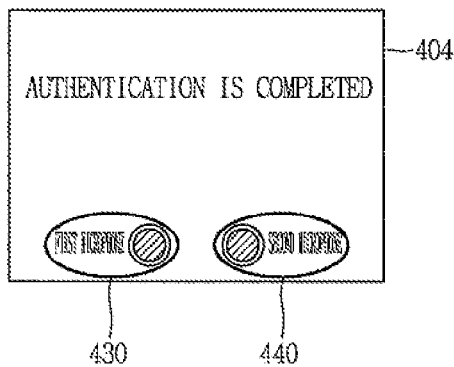
Figure 4C:
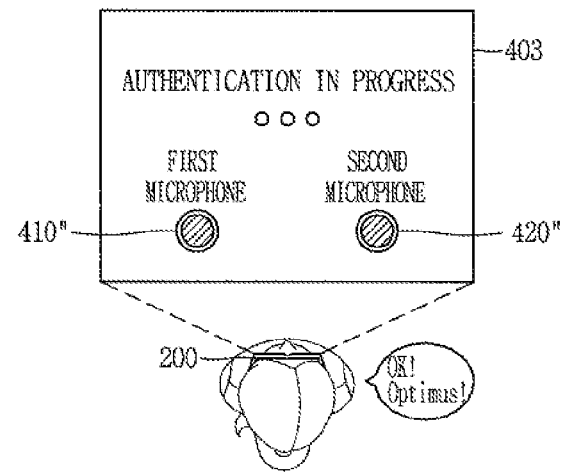
Figure 4E:
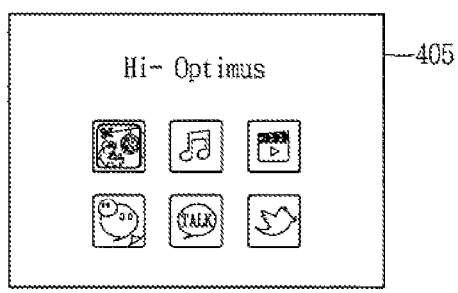

Next, FIGS. 3 to 4(e) illustrate a method in which the locked state is canceled based on the user's voice input through the multiple microphones when the glasses-type terminal 200 according to the embodiment of the present invention is worn. First, referring to FIG. 3, the controller 280 detects that the main body is worn on the user's head (S310). The detection of the main body being worn is possible with various methods. Specifically, the controller 280 detects an inclination and motion of the main body and thus can detect whether or not the main body is worn.

For example, the main body is recognized as being worn on the user's head, if as a result of monitoring the extent with which the inclination and the motion of the main body, a change in the inclination of the main body and acceleration of the main body in motion are the same as or similar to the change and the acceleration that result when the main body is moved with being worn on the user's body. To do this, the glasses-type terminal 200 can include a gyro sensor that senses a spatial motion of the main body in terms of an X-axis, a Y-axis, and a Z-axis.

In addition, the controller 280 detects a touch (and/or a proximity touch) applied to a specific point on the main body or a specific region of the main body, and thus can detect whether the main body is worn by the user. To do this, a touch sensor (and/or a proximity touch sensor) can be provided to the frame of the glasses-type terminal 200. For example, if a specific region or all regions of the frame are configured from touch panels, the frame of the main body comes into contact with the user's nose ridge, the user's cheekbone, the user's temples and the user's tragus, the user's crow's-feet, the user's front head, the user's eyebrow bone, or the like. Thus, if the touch corresponding to a point on or a region of the main body that comes into contact to the user's head and the user's face is detected, the main body is recognized as being worn on the user's head.

In addition, the controller 280 can detect whether or not the main body is worn by analyzing an image captured by the camera 221, or by detecting a predetermined input signal, a biological signal from the wearer, a change in temperature of the frame, or the like. The biological signal from the wearer is an electric signal that occurs in the body of the wearer and includes, for example, an electrocardiogram (ECG) signal, a photoplethymogram (PPG) signal and a galvanic skin response (GSR), but are limited to these signals.

For example, when the glasses-type terminal 200 is detected as being worn, an initial screen 401, which includes a message such as "the glasses-type terminal 200 is detected as being worn," is displayed on the display unit 251 as illustrated in FIG. 4(a). In addition, an alarm corresponding to the main body being worn, for example, a beep, can be output through the sound output module. Further, if as a result of the detection, the main body is not properly worn, a message guiding the proper wearing is output to the display unit 251.

If the main body is detected as being worn, a locked screen is displayed on the display unit 251 of the glasses-type terminal 200. Then, pieces of visual information indicating operational states of the first and second microphones 222a and 222b, respectively, are displayed on the locked screen (S320).

In addition, the first microphone 222a is the bone conduction microphone that includes the bone conduction pick up element, and is arranged to correspond to or be adjacent to at least one of the user's left and right ears. In addition, the first microphone 222a detects the vibration signal that results from the voice of a speaker vibrating the skull of the speaker and thus propagates directly to the speaker's inner ear, using the bone conduction pickup element.

In addition, the first microphone 222a is structurally integrally combined with the speaker. In this instance, a switch is provided to prevent the echo phenomenon from occurring and thus to prevent the first microphone and the speaker from malfunctioning. As a result, according to a switching signal corresponding to a predetermined input, the controller 280 of the glasses-type terminal 200 turns off the speaker, when the first microphone 222a is in an ON state. The controller 280 also turns off the first microphone 222a, when the speaker is in an ON state. That is, only one of the first microphone 222a and the speaker is selectively operated.

In addition, the second microphone 222b is removably mounted on one frame among the frames of the main body using a connector and is thus combined with the main body.

The second microphone 222b detects the voice signal being input and propagating over the air.

In addition, the pieces of visual information include an image or text indicating the first and second microphones 222a and 222b. The image or the text that differs according to each of the operational states of the first and second microphones 222a and 222b is output. For example, the image that differs according to whether or not the microphone is activated is output, if after wearing the main body, the first microphone 222a is activated and thus the user's voice or an external sound can be input, and the second microphone 222b is inactivated and thus the user's voice or the external sound cannot be input. When the first and second microphones 222a and 222b are activated, the vibration signal and the voice signal are detected at the same time from the voice produced from the wearer of the glasses-type terminal 200.

For example, when the main body is detected as being worn as illustrated in FIGS. 4(a) and 4(b), images 410 and 420, for example, are displayed on a screen 402. As shown in FIG. 4(b), the images 410 and 420 can be multiple images in the shape of a circle and indicate that the first microphone (e.g., the bone conduction microphone), and the second microphone (e.g., the microphone that detects the voice signal), are activated, respectively. In addition, a message 408 such as "input your voice," guiding the inputting of the user's voice can be displayed on the screen 402 to guide the user in canceling the locked state of the main body.

Then, when the user's voice is input, the first and second microphones 222a and 222b detect the vibration signal and voice signal of the voice being input according to the operational states of the first microphone and the second microphones 222a and 222b, respectively (S330). For example, referring to FIG. 4(c), the first microphone 222a and the second microphone 222b detect the vibration signal and the voice signal, respectively, from one voice being input, and a screen 403 including a message indicating that the detection of the voice being input is in progress is displayed on the display unit 251. In addition, multiple images 410" and 420" are displayed on the screen 403.

The multiple images 410" and 420" indicate the first microphone 222a detecting the vibration signal and the second microphone 222b detecting the voice signal, respectively. Further, the multiple images 410" and 420" are displayed differently from the images 410 and 420 indicating only an activated state. For example, if the first and second microphone 222a and 222b are in the activated state, the images are displayed with a first color. The images are displayed with a second color while a voice, such as "OK! Optimus!," is input into the activated first and second microphone 222a and 222b.

When the user's voice is input, the controller 280 matches the vibration signal of the user's voice detected through the first microphone 222a and the voice signal of the user's voice detected through the second microphone 222b to the vibration signal and the voice signal, respectively, corresponding to the pre-registered user's voice (S340).

Based on a result of the matching, the locked state of the glasses-type terminal 200 can be switched to the unlocked state (S350). Further, when the vibration signal detected through the first microphone 222a is matched to the pre-registered vibration signal, the controller 280 outputs a first alarm. In addition, if the voice signal detected through the second microphone 222b is matched to the pre-registered voice signal, the controller 280 outputs a second alarm. The first and second alarms can be the same signal, and output in order in which the voice signals are matched, or can be successively output.

In addition, when the vibration signal and the voice signal of the user's voice are matched to the vibration signal and the voice signal, respectively, corresponding to the pre-registered voice of the user, the controller 280 switches the locked state of the glasses-type terminal 200 to the unlocked state. That is, when the external voice and internal voice of the user's voice input are all matched to the pre-registered data, the controller 280 determines that the wearer is the user and thus switches the locked state to the unlocked state.

For example, as illustrated in FIG. 4(d), a message such as "Authentication is completed," indicating authentication completion is displayed on a screen 404 of the display unit 251. Further, an image, for example, "0"-shaped marks 430 and 440, indicating that the vibration signal and the voice signal detected through the first and second microphones 222a and 222b, respectively, are matched to the vibration signal and the voice signal, respectively, corresponding to the pre-registered voice of the user, can be displayed on the images 410" and 420".

In contrast, if any one of the vibration signal and the voice signal of the user who wears the glasses-type terminal 200 fails to be matched to at least one of the vibration signal and the voice signal corresponding to the pre-registered voice of the user, the controller 280 maintains the locked state, or so the unlocked state is limitedly applied to some applications.

For example, even though the voice signal of the user's voice who wears the glasses-type terminal 200, that is, the external voice is very similar to the voice signal corresponding to the pre-registered voice of the user, when the vibration signal in which the voice produced by the user propagates directly to the inner ear of the speaker through the bone and the skull, that is, the internal voice is measured differently from the vibration signal corresponding to the pre-registered voice of the user, the wearer is determined as not being the user, and thus the locked state is maintained.

Therefore, the vibration signal and the voice signal of the voice produced by the user who wears the glasses-type terminal 200 are detected through the first and second microphones 222a and 222b, respectively, and thus whether or not the user's voice input is matched to the pre-registered voice of the user is more precisely recognized.

That is, generally, a feature of the vibration signal corresponding to the voice input into first microphone 222a (e.g., the bone conduction microphone) differs from person to person according to the structure of the bone and the skull, the physique, or the like. Thus, as described above, when the voice signal and the vibration signal of one voice produced by the speaker are detected at the same time, user authentication is performed with more reliability.

Also, the user authentication is a security mechanism by which the user is authenticated using authentication protocols. Of the user authentication methods, a voice authentication method is a feature-based authentication method. Then, according to the embodiment of the present invention, when the vibration signal in which the voice produced by the speaker propagates to the inner ear of the speaker through the bone and the skull is used along with the voice signal of the voice produced by the speaker, the user identification is performed with more reliability and with more stability.

When the locked state switches to the unlocked state, as illustrated in FIG. 4(e), a home screen that includes icons for executing multiple applications is displayed on a screen 405 on the display unit 251, or various unlocked screens such as an execution screen of an application can be displayed on the display unit 251.

Further, a specific word or sentence for canceling the locked state can be set in advance in the glasses-type terminal 200. In this instance, only if the wearer of the glasses-type terminal 200 says the specific word or sentence set in advance, the locked state switches to the unlocked state. That is, even though the vibration signal and the voice signal of the user's voice detected through the first and second microphones 222a and 222b, respectively, are matched to the vibration signal and the voice signal, respectively, corresponding to the pre-registered voice of the user, the locked state is maintained, if the vibration signal and the voice signal of the user's voice detected is not for a specific word or sentence set in advance.

In addition, another example includes displaying an arbitrarily-generated word or sentence on the display unit 251 to guide the wearer to read the word or sentence instead of setting in advance a specific word or sentence. As described above, in order to unlock the glasses-type terminal, the vibration signal and the voice signal of the user's voice are detected through the multiple microphones and thus the wearer is precisely identified. As a result, with the inputting of the voice, the controller 280 can identify in a precise, natural manner whether the wearer is an already-registered user. Accordingly, the locked state of the main body can be canceled while enhancing the security and provide convenience to the user.

Figure 5A:
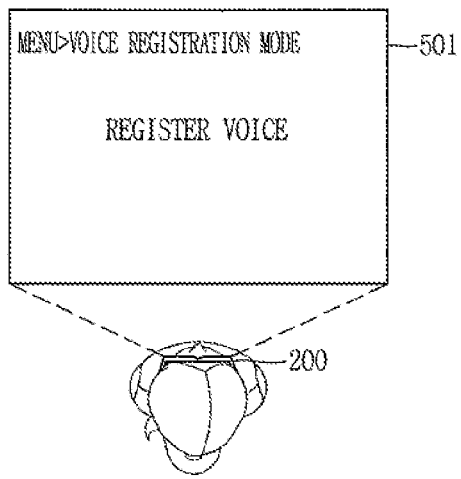
FIGS. 5(a) to 5(e) are diagrams illustrating a method of registering a voice of a user using microphones according to one embodiment of the present invention.

Next, FIGS. 5(a) to 6(d) are diagrams illustrating an example of the user's voice being registered with the glasses-type terminal 200 in order to perform a function of recognizing the user's voice using the microphones for canceling the locked state of the glasses-type terminal 200. As illustrated in FIG. 5(a), the wearer of the glasses-type terminal 200 enters a "menu" by applying a predetermined input and thus activates a voice registration mode. Accordingly, an initial screen 501 including a message "Register Voice" can be displayed on the display unit 251. When the voice registration mode is entered in this manner according to a predetermined input signal, the controller 280 displays text that can be input in a voice.

In addition, the voice corresponding to the text being displayed on the display unit 251 is input through the first and second microphones 222a and 222b, and the controller 280 determines whether the voice being input is consistent with the pronunciation of the text being output. When the voice being input is consistent with the provided pronunciation of the text, the vibration signal input through the first microphone 222a and the voice signal input through the second microphone 222b are registered as the voice of the user.

Figure 5B:
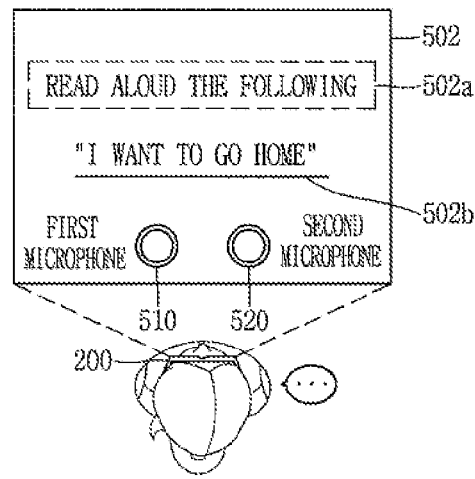

Then, the registered vibration signal and voice signal of the user's voice are stored in the memory 160. For example, as illustrated in FIG. 5(b), a predetermined or arbitrarily-generated specific word or sentence 502b that the user can pronounce is displayed on a screen 502 on the display unit 251 along with a message 502a such as "Read aloud the following" guiding the user to speak the word or sentence 502b.

Further, images 510 and 520 indicating the operational states of the first microphone 222a and the second microphone 222b, respectively, are displayed on one region of the display unit 251. When the images 510 and 520 indicate the first and second microphones 222a and 222b are in an ON state, the vibration signal and the voice signal of the user's voice, that is, the internal voice and the external voice, are recognized as being in a state where the internal voice and the external voice can be detected at the same time.

Figure 5D:
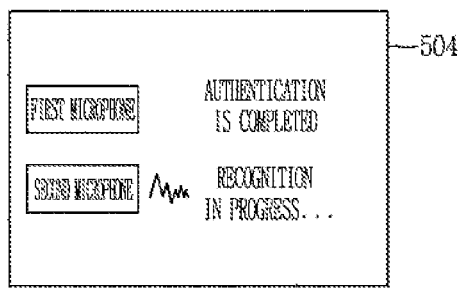
Figure 5C:
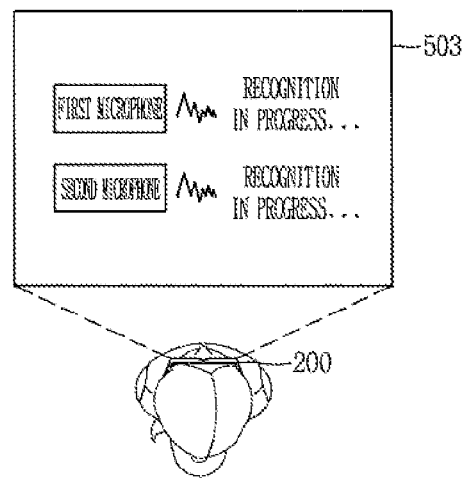

Then, when the wearer of the glasses-type terminal 200 reads the provided sentence 502b aloud, the controller 280, as illustrated in FIG. 5(c), detects the vibration signal and the voice signal of the voice input through the bone conduction microphone 222a and the microphone 222b, respectively. While the detection of the vibration signal and the voice signal is in progress, the controller 280 displays a screen 503 indicating the recognition of the voice on the display unit 251.

Further, the bone conduction microphone 222a and the microphone 222b recognize the vibration signal and the voice signal, respectively, of one voice being input, and thus, as illustrated a screen 504 in FIG. 5(d), the recognition by the bone conduction microphone 222a may be first completed, and the microphone 222b may continue to detect the voice signal. That is, the first and second microphone 222a and 222b may not complete the detection of the voice being input at the same time.

Figure 5E:
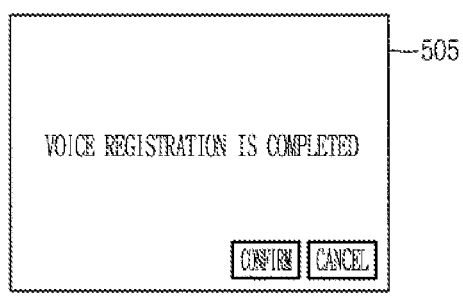

When the vibration signal and the voice signal of the voice input through the first and second microphones 222a and 222b, respectively, are detected, the controller 280 can display a screen 505 including a message indicate the voice registration is complete on the display unit 251 as illustrated in FIG. 5(e). The wearer can then make a response to the message, for example, by speaking a voice command "OK" or "CONFIRM" and thus register the detected vibration signal and voice signal as the voice of the user.

Further, if the vibration signal and the voice signal of the user's voice input through the bone conduction microphone 222a and the microphone 222b, respectively, are not precisely detected, the steps in FIG. 5(b) to 5(d) are repeatedly performed.

Figure 6A:
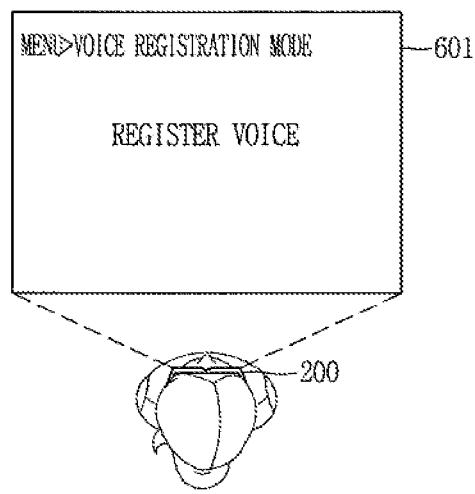
FIGS. 6(a) to 6(d) are diagrams illustrating a method of registering the voices of multiple users according to one embodiment of the present invention.
Figure 6B:
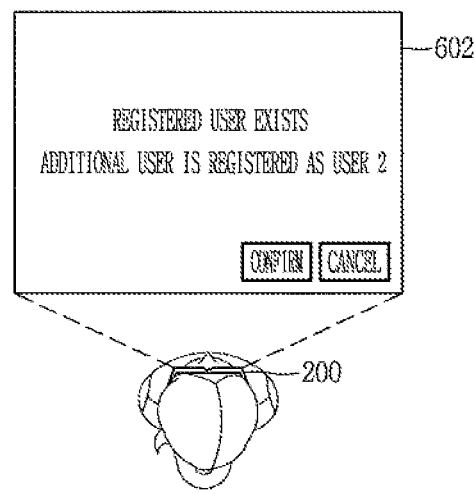

Next, FIGS. 6(a) to 6(d) illustrate an example of a process in which the voices of the multiple users are registered with the glasses-type terminal 200. As illustrated in FIG. 6(a), the wearer of the glasses-type terminal 200 enters the "menu" by applying a predetermined input and thus activates the voice registration mode as shown in a screen 601 displayed on the display unit 251. Further, if the pre-registered user's voice is present, the controller 280 displays a screen 602 including a message asking if the voices of the multiple users are registered, for example, "An additional user is registered as a user 2" on the display unit 251.

Figure 6D:
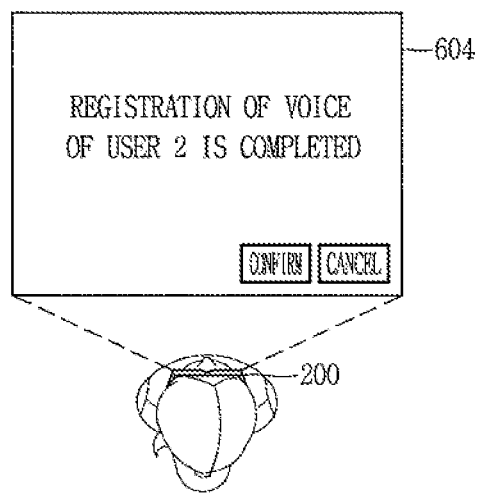
Figure 6C:
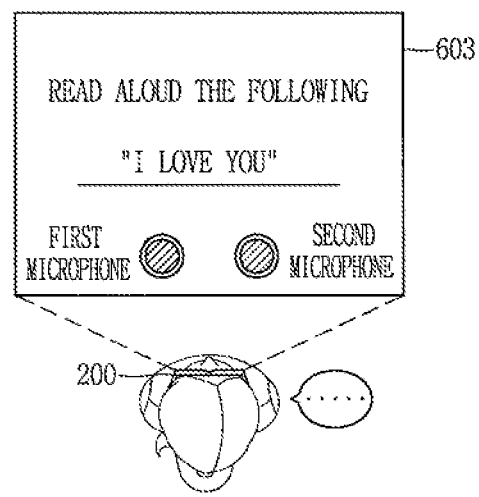

The wearer can respond to the message in the screen 602, for example, by speaking the voice command "OK" or "CONFIRM" and thus continue to proceed with registering the user's voice 2. Accordingly, as illustrated in FIG. 6(c), a message that guides the inputting of the user's voice and a specific sentence are displayed in a screen 603, and the images indicating the operational states of the bone conduction microphone 222a and the microphone 222b, respectively, are displayed on the display unit 251. Then, when the wearer voice is input, the vibration signal and the voice signal of the voice of the wearer input, as illustrated in FIGS. 5(c) and 5(d), are detected at the same time. Thus, when the detection is completed, a message indicating the registration of the voice of the "user 2" is completed, as illustrated in a screen 604 in FIG. 6(d), is displayed.

When the registration of the user's voice 2 is completed, the controller 180 can apply an application range of an unlocked state activated according to the inputting of the voice of the first user previously registered, differently than the application range of the unlocked state activated according to the inputting of the voice of the second user. That is, if the registered user's voice 2 is input, a limitation is imposed so the unlocked state is applied only to some applications.

Further, if the wearer performs the voice command "NO" or "CANCEL" as a response to the message in the screen 602 in FIG. 6(*b*), a message asking if the pre-registered user's voice is changed is output to the display unit 251. Examples are described in more detail below in which after wearing the glasses-type terminal 200 described above, screens change variously corresponding to a result of matching the user's voice input to a pre-registered voice of the user.

There are broadly two types of methods of using the voice command to cancel the locked state of the glasses-type terminal 200. One method is to guide the user through pronunciation of specific text and the other is to input the voice command of a designated person.

In the former case, the glasses-type terminal 200 is in a state where anybody can cancel the locked state, or the specific text set by the user is exposed to the outside when the user pronounces the specific text. Thus, in the former case, a possible security threat can occur and the glasses-type terminal 200 can be unlocked even though the user does not want the glasses-type terminal 200 to be in the unlocked state. When a limitation is imposed so only if the voice of a designated person is input (or only if specific text that is set is input) the locked state is canceled, solves such a problem.

Furthermore, according to the embodiments of the present invention, when recognizing the voice of a designated person, the vibration signal and the voice signal of the voice being input are detected at the same time using the bone conduction microphone 222*a* and the microphone 222*b*. Thus, the voice peculiar to the designated person is identified in a more precise manner. That is, according to the embodiment of the present invention, the vibration signal and the voice signal of the voice being input are all detected and if the detected vibration signal and voice signal are matched to the vibration signal and the voice signal, respectively, of the registered voice of the user, the locked state of the glasses-type terminal 200 is canceled.

Further, if a condition for canceling the locked state is strictly applied in this manner, when the user wants to allow the third party to use the glasses-type terminal 200, it is difficult to process an exceptional situation, such as when the vibration signal and the voice signal of the voice being input are difficult to detect at the same time according to ambient conditions, or when the registered voice of the user's own is damaged or hoarse.

Various examples in which the voice input into the glasses-type terminal 200 fails to be matched to the pre-registered user's voice and a method of processing such a failure are described below referring to FIGS. 7(*a*) to 12B(*b*). In particular, FIGS. 7(*a*) to 7(*c*) illustrates the processes performed when the voice of the wearer does not match the pre-registered voice of the user.

When the glasses-type terminal 200 is detected as being worn, the controller 280 of the glasses-type terminal 200 activates the first and second microphones 222*a* and 222*b*, that is, the bone conduction microphone 222*a* and the microphone 222*b*. When the first and second microphones 222*a* and 222*b* are activated, the controller 280 displays a first image object indicating the operational state of the activated first microphone 222*a* and a second image object indicating that the operational state of the activated second microphone 222*b* on the locked screen.

Further, the first image object indicates the bone conduction microphone 222*a*, and is displayed so the first image object differs in color according to whether or not the bone conduction microphone 222*a* is activated. In addition, the second image object indicates the microphone 222*b*, and is displayed so the second image object differs in color according to whether or not the microphone 222*b* is activated. For example, in an inactivated state, the first and second image objects are displayed in a first color (for example, red), and in an activated state (that is, when the voice can be detected as being input), the first and second image objects are displayed in a second color (for example, green).

If the bone conduction microphone 222*a* and the microphone 222*b* corresponding to the first and second image objects, respectively, are all activated and receive one voice, the glasses-type terminal 200 matches the voice signal detected through the bone conduction microphone 222*a* and the voice signal detected through the microphone 222*b* to the vibration signal and the voice signal, respectively, corresponding to the pre-registered voice of the user.

In addition, the glasses-type terminal 200 makes a comparison between a pronunciation at the time of inputting the voice and a pronunciation at the time of the voice command for canceling the locked state and determines whether or not the pronunciation by the voice being input is consistent with the pronunciation by the voice command for canceling the locked state. For example, if the voice command for causing the locked state to switch to the locked state is set to be "OK! Optimus," a limitation is imposed so if the wearer says "Ok! Optimus" for an input to the glasses-type terminal 200, the vibration signal and the voice signal of this voice are matched to the vibration signal and the voice signal, respectively, corresponding to the pre-registered voice of the user.

Then, the first and second image objects being output to the according to the display unit 251 are made to differ in shape (appearance or color) according to a result of the matching and thus the user can intuitively recognize the result of the matching. That is, the user can recognize whether or not the matching is successful, through the first and second image objects, and for a matching failure, what caused the failure (why the vibration signal detected through the first microphone 222*a* or the voice signal detected through the second microphone 222*b* fails to be matched).

Specifically, the controller 280 changes the first image object differently according to the result of matching the vibration signal detected through the first microphone 222*a* to the pre-registered vibration signal. For example, as illustrated in FIG. 7(*a*), when the vibration signal of the voice input into the first microphone 222*a* is matched to the vibration signal corresponding to the pre-registered voice of the user, a mark, for example, a "0"-shaped mark, is output on a screen 701 that indicates the match to the image object corresponding to the first microphone 222*a*.

In addition, the controller 280 changes the second image object differently according to the result of matching the voice signal detected through the second microphone 222*b* to the pre-registered voice signal. For example, as illustrated in FIG. 7(*a*), when the voice signal of the voice input into the second microphone 222*b* fails to be matched to the voice signal corresponding to the pre-registered voice of the user, a mark, for example, an "X"-shaped mark, is output on the screen 701 that indicates the failure in the match to the image object corresponding to the second microphone 222*b*.

Thus, if any one of the vibration signal and the voice signal of the voice input through the first and second microphones 222*a* and 222*b*, respectively, fails to be matched to at least one of the vibration signal and the voice signal corresponding to the pre-registered voice of the user, the controller 180 displays the screen 701 including a message indicating that authentication of the voice of the wearer has failed.

Figure 7A:
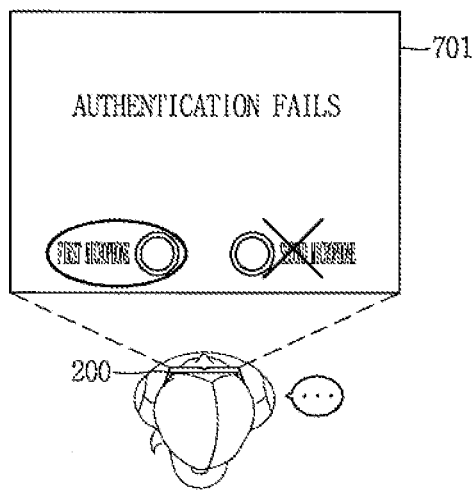
FIGS. 7(a) to 12B(b) are diagrams illustrating various processing methods that are performed when a voice input into the multiple microphones fails to be matched to the pre-registered user's voice according to one embodiment of the present invention.
Figure 7B:
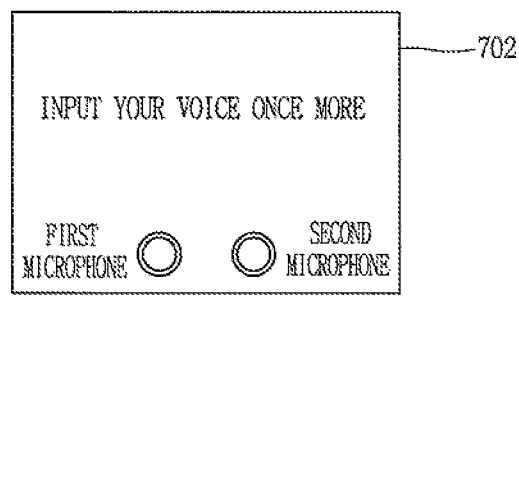

Then, the controller 280 checks again for the operational states of the first and second microphones 222a and 222b and displays a message for guiding the re-inputting of the voice of the user. For example, if the authentication of the voice fails as illustrated in FIG. 7(a), a screen 702 including a guide message such as "Please input the voice once more" is output as illustrated in FIG. 7(b). When the steps in FIGS. 7(a) and 7(b) are repeated a given number of times (for example, three times), the controller 280 can determine that the authentication of the voice ends in failure.

Figure 7C:
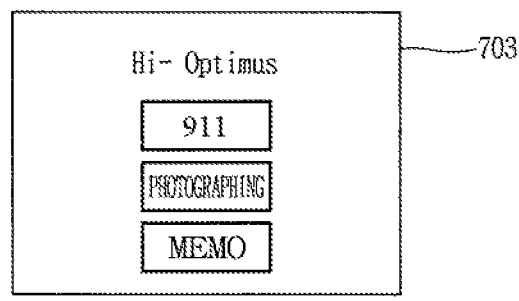

When the authentication of the voice ends in failure in this manner, the controller 280 differently processes when the vibration signal and the voice signal all fail to be matched or when any one of the vibration signal and the voice signal fails to be matched. Specifically, if only any one of the vibration signal and the voice signal of the voice input through the first and second microphones 222a and 222b, respectively, fails to be matched to one of the vibration signal and the voice signal corresponding to the pre-registered voice of the user, the controller 280 switches some predetermined applications from the locked state to the unlocked state, and the other applications maintain the locked state. Accordingly, as illustrated in FIG. 7(c), only icons of some applications that the wearer of the glasses-type terminal 200 can execute are displayed on a home screen 703. For example, only icons of some applications, such as applications associated with an emergency call, photographing, and MEMO are displayed.

In addition, if the vibration signal and the voice signal of the voice input through the first and second microphones 222a and 222b, respectively, fail to be matched to the vibration signal and the voice signal, respectively, corresponding to the pre-registered voice of the user, the locked state of the glasses-type terminal 200 is maintained, and visual information (for example, a message such as "Matching failed") is displayed on the locked screen. Alternatively, a message can be displayed asking whether the locked state is canceled using a method other than the voice recognition.

Further, if the control command is input in a voice even after the glasses-type terminal 200 switches to the unlocked state, a specific application is executed or a specific function is executed only if the voice being input is matched to the pre-registered voice of the user. To do this, the controller 280 continues to maintain activated states of the first and second microphones 222a and 222b and performs a voice authentication process in the background, based on the voice naturally produced by the wearer.

Figure 8A:
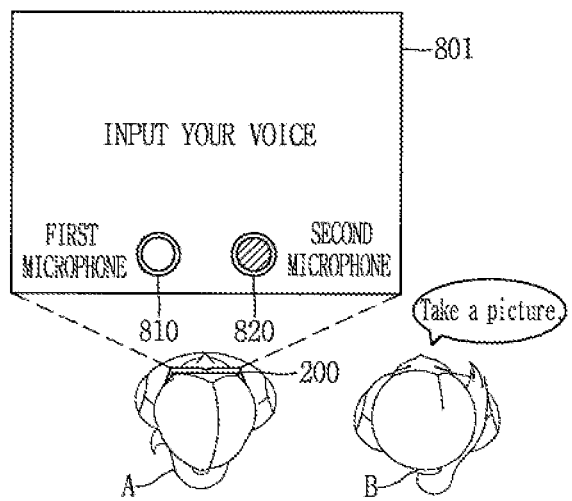
Figure 8B:
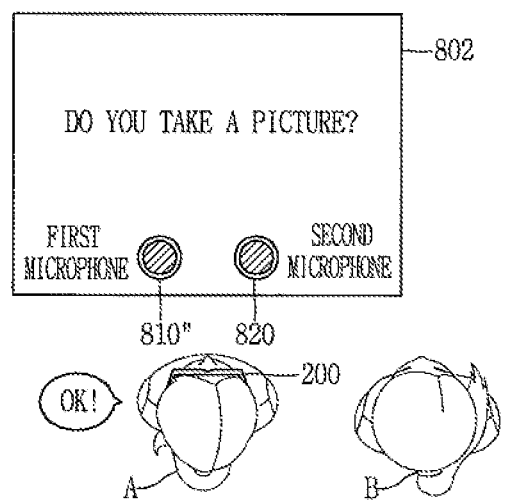
Figure 8C:
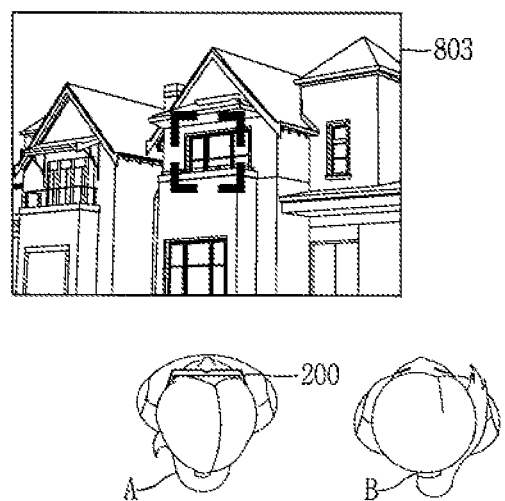

Next, FIGS. 8(a) to 8(c) illustrate a processing method according to one embodiment of the present invention when the user wears the glasses-type terminal 200, but the control command is input in the voice of another party. As described above, control is performed so only if the voice command from the user himself/herself is input even after the locked state of the glasses-type terminal 200 switches to the unlocked state, the glasses-type terminal 200 performs the corresponding function.

In addition, when the voice of the third party is input through the second microphone 122b of the glasses-type terminal 200, the controller 280 recognizes which control command corresponds to the voice of the third party that is input. For example, if the third party B, as illustrated in FIG. 8(a), issues the voice command "Take a picture," the controller 280 recognizes the voice command from the third party B through the second microphone 222b.

Further, the voice command form the third party B input is not detected in the bone conduction microphone 221a, and thus, as illustrated in FIG. 8(a), an image object 810 indicating that the first microphone is in an activated state and an image object 820 indicating the recognition by the second microphone of the voice command from the third party B is in progress are output in a screen 801 on the display unit 251.

As a result, the controller 280 of the glasses-type terminal 200, as illustrated in FIG. 8(b), outputs a screen 802 on the display unit 251 including a message asking if a function corresponding to the voice command from the third party B, that is, a photographing function, should be performed. That is, the controller 280 provides information on a function corresponding to the voice command to the display unit 251, but does not execute the function.

Then, if for example, the voice command "OK" is input as a response to the message, the controller 280 performs a voice recognition process on the response through the first and second microphones 222a and 222b. In addition, the controller 280 displays multiple image objects 810" and 820 indicating that the recognition by the first and second microphones 222a and 222b of the voice of the wearer input is in progress.

Only when the vibration signal and the voice signal of the voice of the wearer detected through the first and second microphones 222a and 222b, respectively, are matched to the vibration signal and the voice signal, respectively, corresponding to the pre-registered voice of the user, the function corresponding to the voice command from the third party B, that is, the "photographing function" is performed. FIG. 8(c) illustrates a preview screen 803 corresponding to the performance of the photographing function.

When the glasses-type terminal 200 is in the locked state, the processing methods according to the embodiment, which are described above, can be applied also to cancel the locked state of the glasses-type terminal 200. FIGS. 9(a) to 10(d) illustrate examples in which if the voice input in the locked state of the glasses-type terminal 200 is the voice of the third party, not the voice of the wearer, the locked state switches to the unlocked state in a limited manner.

In this instance, as described in detail below, the locked state of the glasses-type terminal 200 is canceled when a predetermined condition is satisfied. Thus, a mode in which the locked state is canceled in this manner is defined as a "guest mode" in order to be distinguished from a mode in which the locked state is canceled in the voice of the wearer himself/herself. According to an embodiment, a specific example in which the guest mode is entered is described below.

Figure 9A:
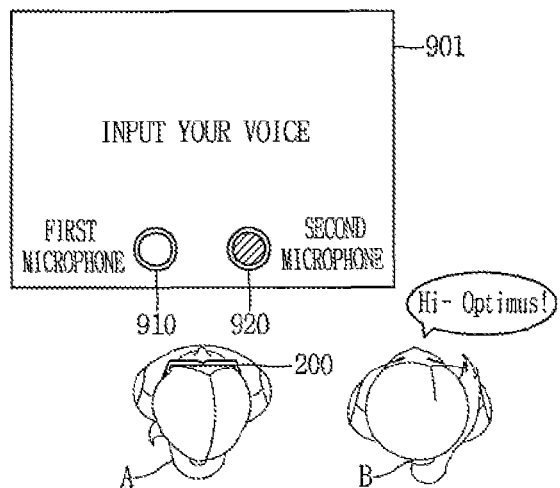

First, according to a first embodiment, there is an example in which the third party, not the wearer of the glasses-type terminal 200, inputs the voice command in order to cancel the locked state. For example, as illustrated in FIG. 9(a), when the user A wears the glasses-type terminal 200, the third party B who is close to the user A issues the voice command for canceling the locked state, for example, "Hi, Optimus," the controller 280 detects the voice signal of the voice command through the second microphone 222b. Further, the user A intuitively knows that the fast microphone 222a (e.g., the bone conduction microphone) does not recognize the voice command from the third party B, because the displayed first and second image objects 910 and 920 output on a screen 901 are different in shape from each other.

As a result of the detection, the controller 280 recognizes that the voice command from the third party B input is consistent with the control command for canceling the locked state, but is not the pre-registered user's voice. If the vibration signal and the voice signal of the voice input through the first and second microphone 222a and 222b fail to be matched to the vibration signal and the voice signal, respectively, corresponding to the preregistered voice, the controller 280 outputs to the display unit 251 visual information requesting a user response for determining whether or not the locked states of some predetermined applications switch to the unlocked state.

Figure 9B:
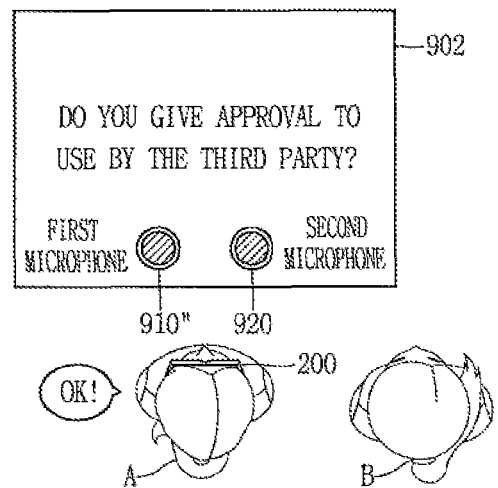

For example, as illustrated in FIG. 9(b), a screen 902 including a message asking if the locked states of some predetermined applications switch to the unlocked state, for example, "Do you give an approval to the use by the third party?" is displayed on the display unit 251. If as a response to the visual information being input, that is, the message in the screen 902, the user wearing the glasses-type terminal 200 accordingly inputs the voice command "OK," the controller 280 performs control so during a period of time in which a predetermined condition is satisfied, the voice of the third party input is recognized as the pre-registered voice of the user. That is, the locked state of the glasses-type terminal 200 is canceled in the guest mode.

In addition, the predetermined condition means a condition for processing the voice of the third party, which is input, in the same manner as the pre-registered voice of the user. For example, a range in which the voice command can be applied may be limited in application target, such as when a command for executing some applications is set to be performed through the voice command or when a command for performing a predetermined function is set to be performed through the voice command. Alternatively, a range in which the voice command can be applied may be limited in time, such as when the voice of the third party is set to be recognized as the pre-registered user's voice only for a predetermined time.

Figure 9D:
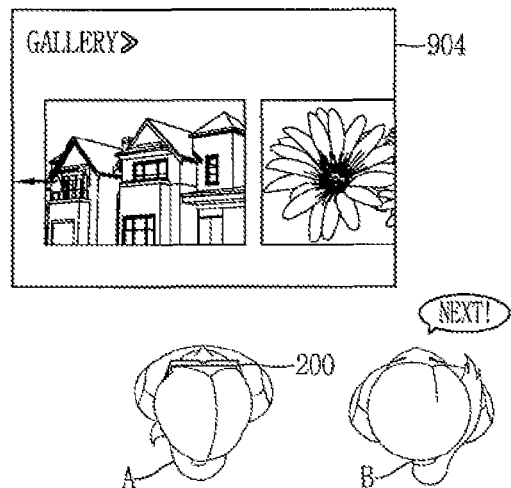
Figure 9C:
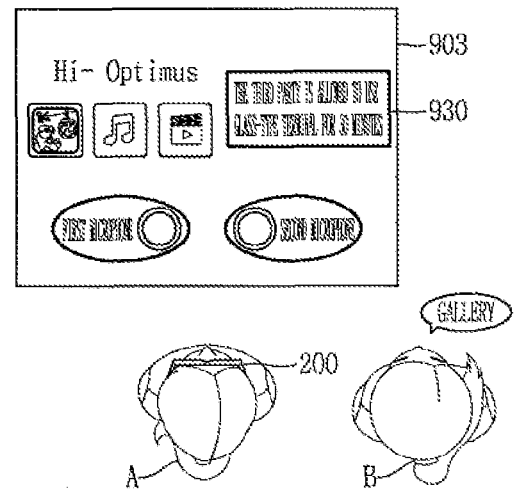

For example, as illustrated in FIG. 9(c), the locked state of the glasses-type terminal 200 switches to the unlocked state, and visual information 930 indicating a predetermined condition, for example, a message such as "The third party is allowed to use the glasses-type terminal 200 for 30 minutes" is output to one region of an unlocked home screen 903. Then, as illustrated in FIGS. 9(c) and 9(d), a gallery application corresponding to the voice command, for example, "gallery," input by the third party B is executed for 30 minutes thereafter. In addition, when a photo image corresponding to the execution of the gallery application is output, the voice command, "Next," is input by the third party B, a photo image stored after the currently displayed photo image is displayed in a screen 904.

In addition, when the predetermined condition is canceled, the controller 280 processes the voice of the third party input through the first and second microphones 222a and 222b differently than the pre-registered voice of the user. For example, when the time predetermined in FIG. 9(c) elapses, although a voice command is input by the third party B thereafter, the glasses-type terminal 200 does not perform a function corresponding to the voice command.

Figure 10A:
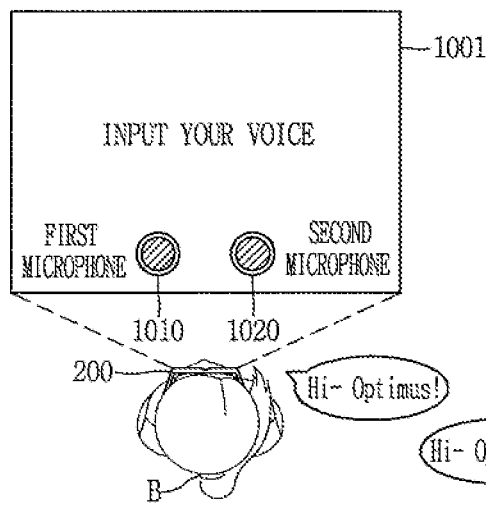

In addition, according to a second embodiment, the third party can wear the glasses-type terminal 200 and input the voice command for canceling the locked state. For example, if the third party B, as illustrated in FIG. 10(a), wears the glasses-type terminal 200 and inputs a predetermined cancellation voice command, for example, "Hi, Optimus!" in response to a message on a screen 1001, the predetermined cancellation voice command is not matched to the pre-registered voice of the user, and thus image objects are output in a screen 1002 including a message indicating the failure in the match. The image objects indicate that the vibration signal and the voice signal detected through the first and second microphones 222a and 222b, respectively, and which are a cause of the failure in the match, fail to be matched to the vibration signal and the voice signal, respectively, corresponding to the pre-registered voice of the user.

Figure 10B:
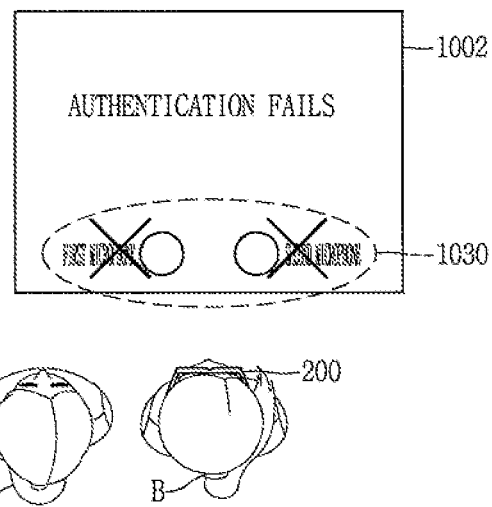

That is, as illustrated in FIG. 10(b), an "X"-shaped mark in a region 1030 indicating the failure in the match is displayed on each of the image objects indicating the operational state of the first microphone 222a and the second microphone 222b. Thereafter, if "Hi, Optimus" is input by the user himself/herself that is registered with the glasses-type terminal 200, the locked state of the glasses-type terminal 200, as illustrated in a screen 1003 in FIG. 10(c), is canceled in the guest mode.

Even though "Hi, Optimus!" is input by the registered user himself/herself, the vibration signal that propagates to the skull through the first microphone 222a is not detected because the wearer of the glasses-type terminal 200 is the third party. Accordingly, it is apparent from FIG. 10(c) that an X-shaped mark in a region 1040 indicating the failure in the match is output on the image object indicating the operation state of the first microphone 222a.

When the locked state of the glasses-type terminal 200 is canceled in the guest mode, only the command for executing some applications or the command for performing a predetermined function is performed through the voice command. For example, as illustrated in FIG. 10(d), if the voice command "Take a picture" is input by the third party B who wears the glasses-type terminal 200, a preview screen 1004 is output corresponding to the performance of the "photographing function." Further, if the voice command "phone book" is input by the third party B who wears the glasses-type terminal 200, an address view function may not be performed for protection of personal information.

In addition, as described above, in FIGS. 10(a) to 10(d), the guest mode is activated only if the voice command is input by the third party and then the user himself/herself of the glasses-type terminal 200 gives the approval to the use of the glasses-type terminal 200. However, in another example, even though the user himself/herself does not give the approval to the use of the glasses-type terminal 200, only if the voice command input by the third party is consistent with the voice command for canceling the locked state of the glasses-type terminal 200, the guest mode may be activated.

Further, according to one embodiment of the present invention, if the voice of the wearer of the glasses-type terminal 200 is not recognized consecutively several times through the first and second microphones 222a and 222b another input mechanism can be provided for canceling the locked state.

Figure 10D:
Figure 10C:
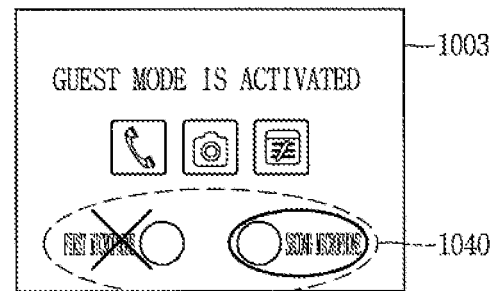
Figure 11A:
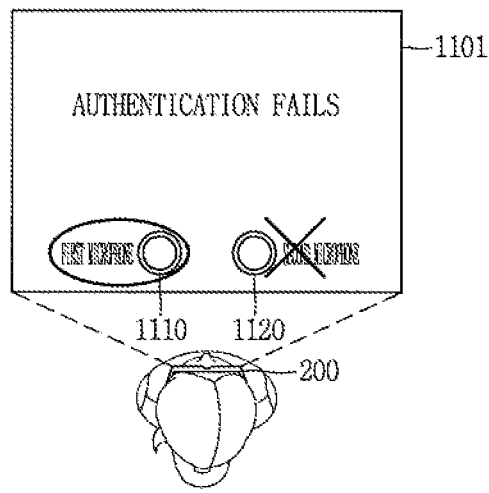

FIGS. 11(a) to 10(d) illustrate such a case. In particular, when it is detected that the glasses-type terminal 200 is worn on the user's head, the locked screen is output to the display unit 251. In addition, the image objects indicating the operational states of the activated first and second microphones 222a and 222b, respectively, are output on the locked screen. That is, a state where the locked state is canceled through the voice command is achieved.

Figure 11B:
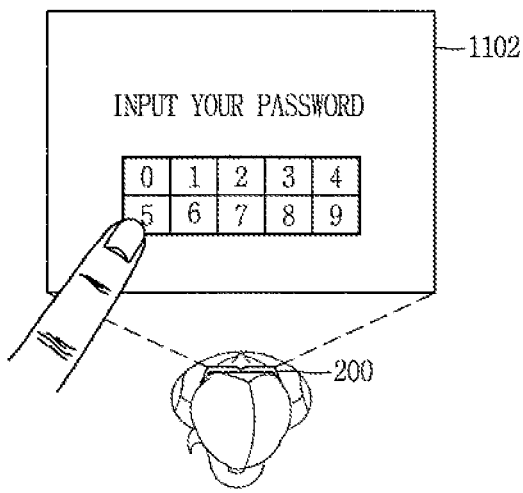

If any one of the vibration signal and the voice signal of the voice input through the activated first and second microphones 222a and 222b fails to be matched to at least one of the vibration signal and the voice signal corresponding to the pre-registered voice of the user, a predetermined number of times or more, the controller 180 provides a different method of switching the locked state to the unlocked state. For example, illustrated in a screen 1101 in FIG. 11(a), if the vibration signal and the voice signal of the voice of the wearer detected through the first and second microphones 222a and 222b, respectively, as illustrated in FIG. 11(a), fail to be matched to the vibration signal and the voice signal, respectively, corresponding to the pre-registered voice of the user, a screen 1102 for inputting a password as another input method of canceling the locked state, as illustrated in FIG. 11(b), is output to the display unit 251. Further, the different input method is predetermined or changed in advance through the user's setting.

If the wearer performs inputting corresponding to the different input method being provided and thus the locked state switches to the unlocked state, the controller 280 switches the unlocked state back to the locked state when a time elapses that is predetermined according to the inputting corresponding to the different. For example, as illustrated in FIG. 11(c), if a predetermined password is input and thus the locked state is canceled, a message 1130 indicating that the unlocked state is maintained only for a predetermined time, for example, such as "The unlocked state is maintained for 30 minutes," is output on one region of a home screen 1103.

Figure 11D:
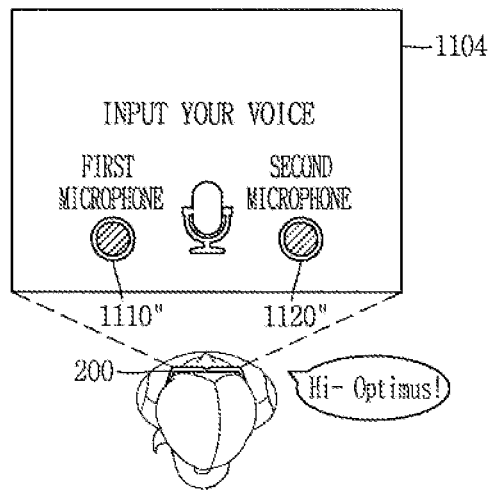
Figure 11C:
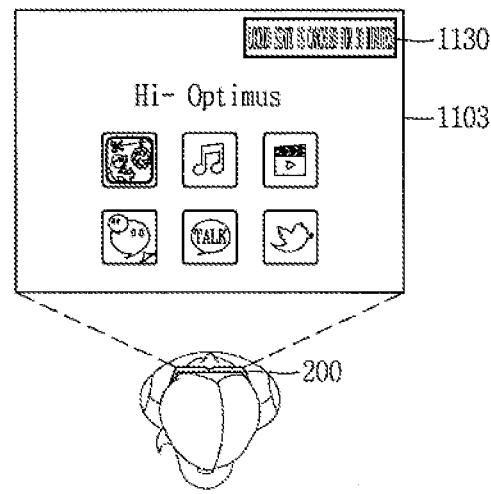

Then, when the predetermined time elapses, the glasses-type terminal 200, as illustrated in FIG. 11(d), switches back to the locked state, and a screen 1104 including a message for guiding the inputting of the user's voice and images objects 1110" and 1120" indicating the operational states of the first and second microphones 222a and 222b, respectively, are output to the display unit 251.

Further, even though the wearer of the glasses-type terminal 200 is the user himself/herself, in some instances, the vibration signal and the voice signal of the voice being input fail to be matched to the vibration signal and the voice signal, respectively, corresponding to the pre-registered voice of the user. As such an example, if a level of ambient sound is out of a reference range, when at least one of the operational states of the first microphone 222a and the second microphone 222b is an OFF state, in some instances, the user's voice himself/herself is hoarse or damaged and thus is not recognized as the user's voice in the glasses-type terminal 200.

Figure 12A:
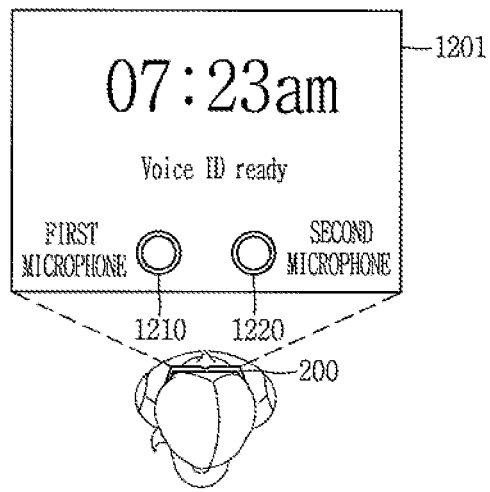
Figure 12A:
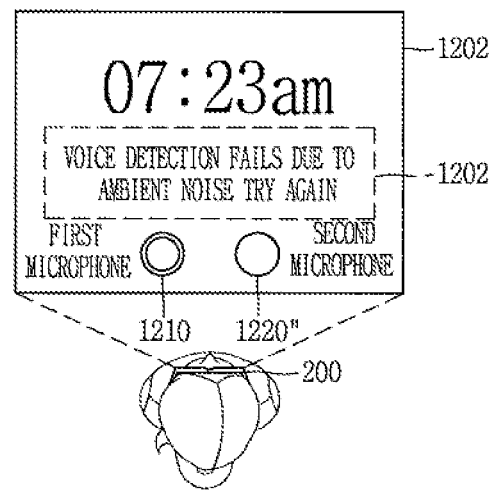

FIGS. 12A(a) to 12B(b) illustrate an processing method performed from a partial screen 1201 in FIG. 12A(a) when the voice of the wearer fails to be matched to the pre-registered user's voice due to the ambient noise. Specifically, when the main body is detected as being worn, the controller 280 detects the ambient noise input through the first and second microphones 222a and 222b. Further, the first microphone 222a that detects the vibration signal in which the voice being input propagates through a bone or skull portion associated with the external ear is comparatively resistant to noise and thus the ambient noise is detected through the second microphone 222b exposed to the external environment.

Figure 12B:
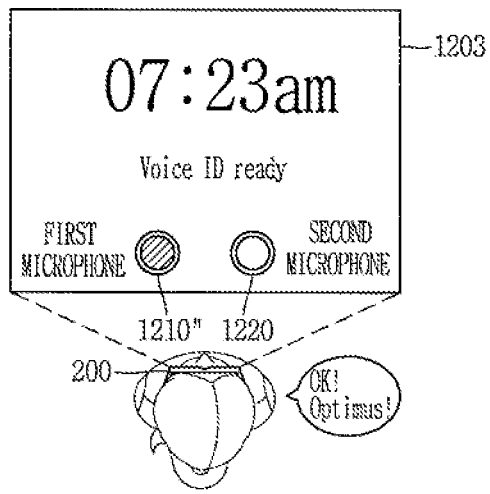
Figure 12B:
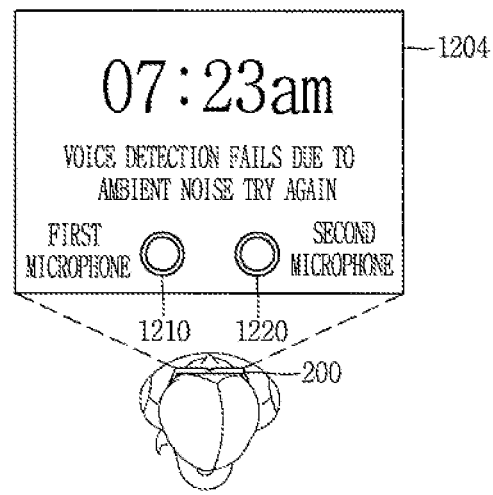

When it is determined that the ambient noise is out of a predetermined reference range, the controller 280 outputs on the locked screen visual information indicating that the failure in the match is due to the ambient noise. For example, as illustrated in FIG. 12B(a), if the wearer of the glasses-type terminal 200 inputs the voice command "OK! Optimus!," when the second microphone 222b cannot detect the voice due to the ambient noise as indicated by the image 1220 in a screen 1203, a screen 1204 including a message alerting the user to a cause of the failure in the match, such as "The ambient noise is detected and thus the authentication fails" is output on the display unit 251, as illustrated in FIG. 12B(b).

Further, when it is determined that the ambient noise is out of the predetermined reference range before the user inputs the voice command, the controller 280, as illustrated in FIG. 12A(a), outputs a screen 1202 to the display unit 251 including a message 1203 indicating that the voice cannot be detected due to the ambient noise, as illustrated in FIG. 12A(b). In addition, an image object 1220 indicating the operational state of the second microphone 222b that cannot detect the voice due to the ambient noise, for example, is changed from a shape of two concentric circles to a shape of one circle, and thus the shape of one circle is output as an image object 1220".

Further, if at least one of the operational states of the first and second microphones 222a and 222b is the OFF state, when the user's voice himself/herself is damaged and thus is not detected as the user's voice in the glasses-type terminal 200, the glasses-type terminal 200, as described referring to FIGS. 11(a) to 11(d), provides a different method of canceling the locked state.

The different method of canceling the locked state includes a method corresponding to a knowledge-based authentication method, a possession-based authentication method, or a feature-based authentication method. The knowledge-based authentication methods include an ID/password authentication method, a pass phrase authentication method, a pre-registered question and answer authentication method, and an i-pin authentication method. The possession-based authentication methods include a security card authentication method, a certificate authentication method, and an HSM authentication method. The feature-based authentication methods include a fingerprint authentication method, an iris or retina authentication method, a hand shape authentication method, a face authentication method, and a signature authentication method.

In addition, in another example, the controller 180 determines a mental state of the wearer, based on a vibration pattern of the voice input through the second microphone 222b. If it is determined that the mental state of the wearer is an extremely excited state or tense state, the controller 280 provides a different method of canceling the locked state or maintains the locked state. To do this, the glasses-type terminal 200 detects a biological signal of the wearer using a PPG sensor, a GSR sensor, an SKT sensor, and the like that are provided to the main body, and thus uses the biological signal in determining the mental state of the wearer.

In an alternative embodiment, the controller 180 can determine that the user is improperly wearing the glasses (e.g., a crooked angle, etc.) and thus the first microphone 222a does not properly detect the vibration signal. Therefore, the vibration signal received through the first microphone is not properly processed. In this instance, the controller 180 can output a signal to the user to place the glasses properly on their head, or another type of warning to let the user know the vibration is not being sufficiently received through the first microphone.

For example, the output warning signal can be am audio message, a text message, display information indicating a picture of the glasses being worn improperly, display information indicating how to properly wear the glasses, etc. or any combination of these warning signals. LED lighting may also be used.

Further, as illustrated in FIGS. 13(a) to 13(d), even after the locked state of the glasses-type terminal 200 switches to the unlocked state, if a request for the inputting of the information for the user authentication is included in an execution screen corresponding to the execution of the a predetermined application, the voice recognition process is applied that uses the first and second microphones 222a and 222b.

Figure 13A:
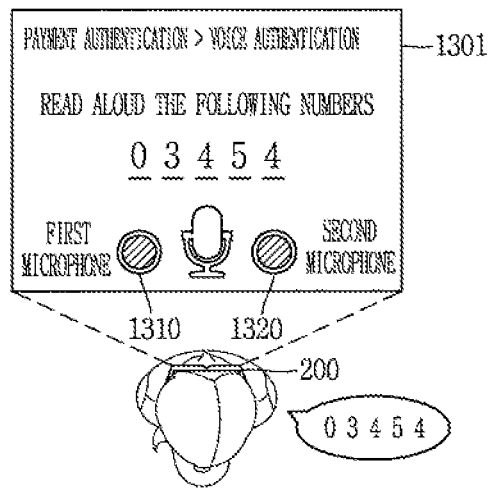
FIG. 13(a) to 13(d) are diagrams illustrating a method of performing user authentication using the multiple microphones according to one embodiment of the present invention.

For example, as illustrated in FIG. 13(a), if a voice recognition method is selected as an authentication method of payment authentication, specific letters or numbers that guide the inputting of the user's voice are output on a screen 1301 to the display unit 251. Then, image objects 1310 and 1320 are output that indicate which the first and second microphones 222a and 222b of the glasses-type terminal 200 are activated.

Figure 13B:
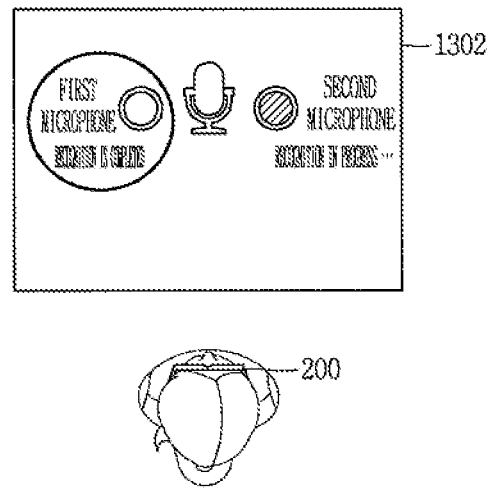
Figure 13D:
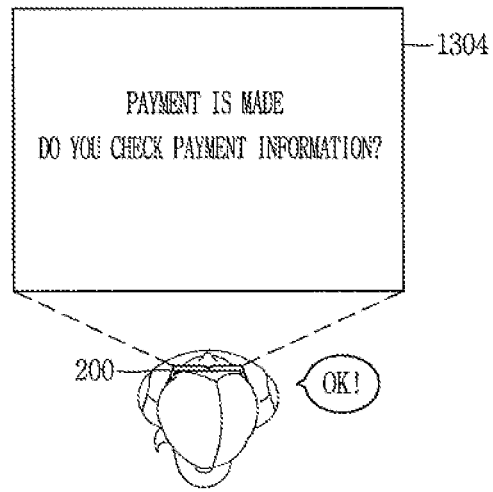
Figure 13C:
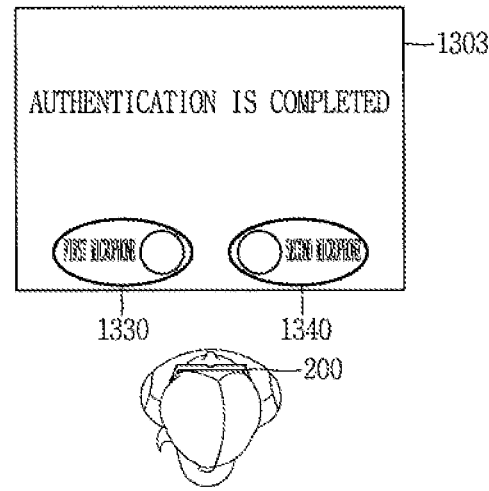

If in response to the request for the inputting of the information, the wearer reads aloud the specific letters and numbers that are provided, the controller 280 determines whether or not the vibration signal detected through the first microphone 222a the voice signal detected through the second microphone 222b are matched to the vibration signal and the voice signal, respectively, corresponding to the pre-registered voice of the user as shown in a screen 1302 in FIG. 13(b). Then, the user authentication is performed based on a result of the determination and displayed with image objects 1330 and 1340 in a screen 1303 as shown in FIG. 13(c).

For example, if the wearer of the glasses-type terminal 200 read aloud provided numbers, for example, "03454," the vibration signal and the voice signal of "03454" input through the first microphone 222a and the second microphone 222b are detected as illustrated in FIG. 13. When the authentication is completed, a screen 1304 including a message asking whether or not payment information will be checked is output to the display unit as illustrated in FIG. 13(d).

As described above, the glasses-type terminal according to the embodiment of the present invention is realized so the vibration signal and the voice signal that are detected at the same time from the user's voice input using the multiple microphones in order to cancel the locked state. Thus, only with the inputting of the voice, it is identified, in a more precise, natural manner, whether the wearer is the registered user. Accordingly, the locked state of the main body is canceled in a manner that enhances the security and provides convenience to the user. In addition, only with the voice being input, it is identified whether the wearer is the registered user or the third party, and thus it is possible to set the number of executable applications differently. Accordingly, even though the third party is allowed to use the glass-type terminal, privacy of the registered user can be protected.

The foregoing embodiments and advantages are merely and are not to be considered as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A glasses-type terminal comprising:
    a main body configured to be worn as glasses on a user's head;
    a first microphone configured to detect a vibration signal through a skull portion of the user in which a voice input propagates through the skull portion of the user;
    a second microphone configured to detect a voice signal in which the voice input propagates over the air;
    a display unit; and
    a controller configured to:
    activate the first and second microphones in response a user wearing the main body,
    display, in a locked state of the display unit, information indicating an operational state of the first and second microphones in response to the activation of the first and second microphones,
    receive the voice input, and
    switch the locked state to an unlocked state when the vibration signal detected through the first microphone is matched to a pre-registered vibration signal and the voice signal detected through the second microphone is matched to a pre-registered voice signal.

2. The glasses-type terminal of claim 1,
    wherein the controller is further configured to:
    recognize that the main body is worn as glasses, display a locked screen on the display unit and display the information on the locked screen in response to the user wearing the main body, and
    detect, in response to the received voice input, the vibration signal of the voice input through the first microphone and the voice signal of the voice input through the second microphone.

3. The glasses-type terminal of claim 1, wherein the information includes a
    first image object indicating the operational state of the activated first microphone and a second image object indicating the operational state of the activated second microphone.

4. The glasses-type terminal of claim 3, wherein the controller is further configured to:
    display differently the first image object according to a result of matching the vibration signal detected through the first microphone to the pre-registered vibration signal, and
    display differently the second image object according to a result of matching the voice signal detected through the second microphone to the pre-registered voice signal.

5. The glasses-type terminal of claim 1, wherein the first microphone includes a bone conduction pickup element and is arranged to correspond to at least one of the user's left and right ears, and
    wherein the second microphone is configured to be removably mounted on one frame of the main body using a connector and thus combined with the main body.

6. The glasses-type terminal of claim 5, wherein the first microphone is integrally combined with a speaker, and
    wherein the controller is further configured to turn the speaker off, when the first microphone is in an ON state, and turn off the first microphone, when the speaker is in the ON state.

7. The glasses-type terminal of claim 1, wherein the controller is further configured to:
    execute a voice registration mode based on a predetermined input signal,
    display text on the display unit, determine whether a voice corresponding to the displayed text input through the first and second microphones is consistent with pronunciation of the displayed text, and register the voice as a vibration signal input through the first microphone and a voice signal input through the second microphone, based on a result of the determination.

8. The glasses-type terminal of claim 7, wherein in the voice registration mode, the controller is further configured to:

register a vibration signal and a voice signal for a first user and a second user, and differently apply an application range of the unlocked state for the first user differently than the application range of the unlocked state for the second user.

9. The glasses-type terminal of claim 1, wherein the controller is further configured to:

output a first alarm, if the vibration signal detected through the first microphone is matched to the pre-registered vibration signal, and output a second alarm, if the voice signal detected through the second microphone is matched to the pre-registered voice signal.

10. The glasses-type terminal of claim 1, wherein when any one of the vibration signal and the voice signal of the voice input through the first and second microphones fails to be matched to one of the pre-registered vibration signal and the pre-registered voice signal, the controller is further configured to apply the unlocked state to some predetermined applications and maintain the locked states of other applications.

11. The glasses-type terminal of claim 1, wherein when the vibration signal and the voice signal of the voice input though the first and second microphones fail to be matched to the pre-registered vibration signal and the pre-registered voice signal, respectively, the controller is further configured to maintain the locked state and display information indicating the failure in the match.

12. The glasses-type terminal of claim 1, wherein if the vibration signal and the voice signal of the voice input through the first and second microphones fail to be matched to the pre-registered vibration signal and the pre-registered voice signal, respectively, the controller is further configured to display information requesting a user's response for determining whether or not to switch some predetermined applications to the unlocked state.

13. The glasses-type terminal of claim 12, wherein based on the user's response corresponding to the information requesting a user's response, the controller is further configured to recognize a voice of a third party as the pre-registered voice, during a period of time in which a predetermined condition is satisfied.

14. The glasses-type terminal of claim 1, wherein when the voice input through the first and second microphones is matched to a voice command for causing the locked state to switch to the unlocked state, and the pre-registered vibration signal and the pre-registered voice signal of the voice input fail to be matched to the vibration signal and the voice signal, respectively, the controller is further configured to apply the unlocked state to some predetermined applications and to output icons on a locked screen indicating that the some predetermined applications are in the unlocked state.

15. The glasses-type terminal of claim 1, wherein if any one of the vibration signal and the voice signal of the voice input through the first and second microphones fails to be matched to at least one of the pre-registered vibration signal and the pre-registered voice signal a predetermined number of times or more, the controller is further configured to provide a different input method of unlocking the locked state.

16. The glasses-type terminal of claim 15, wherein if the locked state switches to the unlocked state according to an input using the different input method, the controller is further configured to switch the unlocked state back to the locked state when a predetermined time elapses.

17. The glasses-type terminal of claim 1, wherein the controller is further configured to:

detect an ambient noise input through the second microphone, when the main body is worn as glasses, and when a level of the ambient noise detected is out of a predetermined reference range, display information indicating that a failure in the match is due to the ambient noise.

18. The glasses-type terminal of claim 1, wherein the controller is further configured to:

display an execution screen including a request for inputting of user authentication information, after the locked state switches to the unlocked state.

19. The glasses type terminal of claim 1, wherein the controller is further configured to:

determine whether the first microphone is sufficiently receiving the vibration signal, and output a warning signal to indicate the microphone is not sufficiently receiving the vibration signal, when the first microphone is not sufficiently receiving the vibration signal.

20. A method of controlling a glasses-type terminal, the method comprising:

activating a first microphone of the glasses-type terminal configured to detect a vibration signal through a skull portion of a user in which a voice input propagates through the skull portion of the user, and activating a second microphone of the glasses-type terminal configured to detect a voice signal in which the voice input propagates over the air, in response to the user wearing the glasses-type terminal;

displaying, in a locked state of the display unit of the glasses-type terminal, information indicating the operational state of the first and second microphones in response to the activated first and second microphones;

receiving the user's voice input;

detecting, with the first microphone, the vibration signal from the received user's voice input;

detecting, with the second microphone, the voice signal from the received user's voice input; and switching, via a controller of the glasses-type mobile terminal, the locked state to an unlocked state when the vibration signal detected through the first microphone is matched to a pre-registered vibration signal and the voice signal detected through the second microphone is matched to a pre-registered voice signal.

* * * * *